Aug. 4, 1925.

J. H. HAMMOND, JR 1,548,811

SYSTEM OF CONTROL BY LIGHT WAVES

Original Filed Jan. 6, 1920

INVENTOR
John Hays Hammond Jr.
BY
A. G. Gardner
HIS ATTORNEY

Patented Aug. 4, 1925.

1,548,811

UNITED STATES PATENT OFFICE.

JOHN HAYS HAMMOND, JR., OF GLOUCESTER, MASSACHUSETTS.

SYSTEM OF CONTROL BY LIGHT WAVES.

Application filed January 6, 1920, Serial No. 349,802. Renewed January 6, 1925.

*To all whom it may concern:*

Be it known that I, JOHN HAYS HAMMOND, Jr., a citizen of the United States, residing at Gloucester, in the county of Essex and State of Massachusetts, have invented certain new and useful Improvements in Systems of Control by Light Waves, of which the following is a specification.

In experiments which I have made in controlling one or more devices through the action of light waves upon a selenium cell I have found that one of the difficulties encountered in these experiments was due to the fact that there was an appreciable lag in the operation of the cell, that is to say that after a flash of light representing a signal had energized the cell, instead of the cell recovering rapidly its former non-conductive state upon the cessation of the light signal, the cell remained in such condition as to allow considerable electric current to pass through it for some time after the light signal had been discontinued, and thus continued to energize the apparatus controlled by the cell for some time after the light signal had ceased. Because of this lag in the action of the cell considerable unreliability of control was experienced.

In my later researches to overcome this difficulty I discovered that if the electric circuit of which the cell formed a part, was temporarily interrupted or broken immediately after it had been acted upon by the light signal, the cell would quickly recover its non-conducting properties and be rendered again responsive to the light signals thus making the receiving system more reliable and making it possible to receive an increased number of signals effectively within a given period.

Some of the objects of this invention are to provide in a receiving system for radiant energy means for automatically interrupting a circuit controlled by a detector of radiant energy to restore the detector to a responsive condition; and to provide other improvements as will hereinafter appear.

Figure 1:
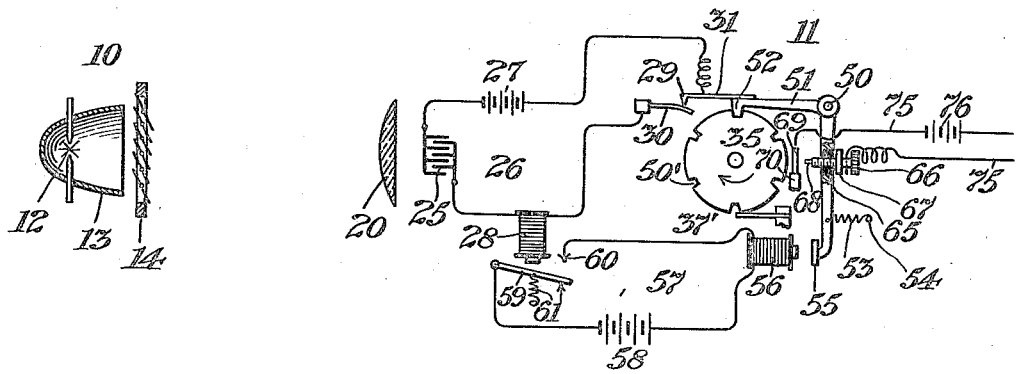
Figure 2:
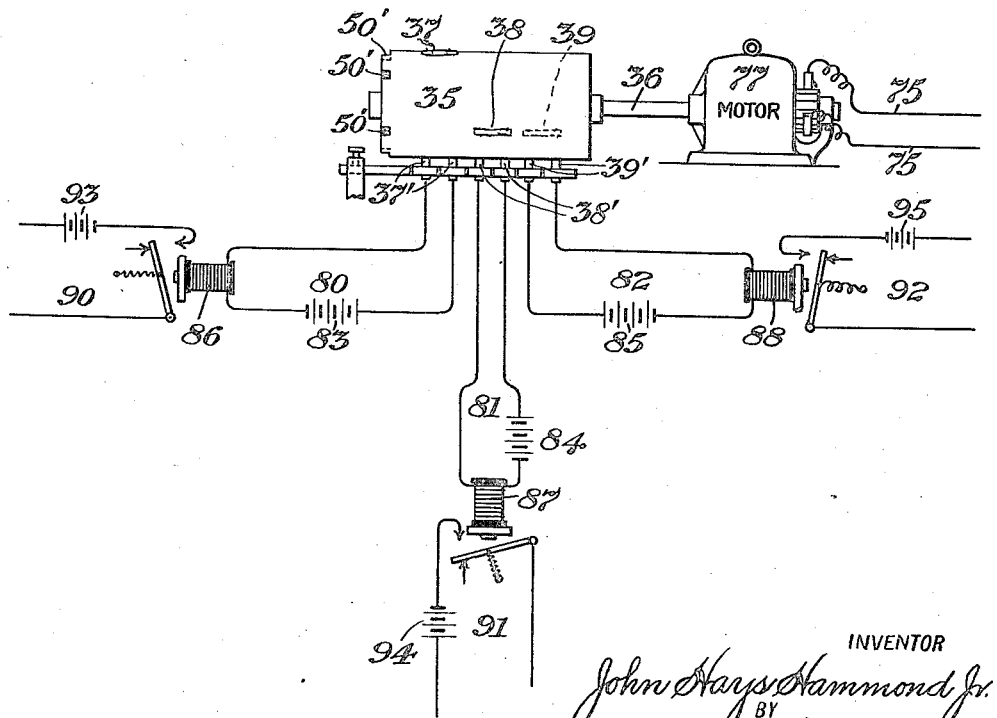

In the accompanying drawings, Fig. 1 is a diagrammatic side elevation of a system for transmitting and receiving radiant energy, constructed in accordance with this invention; and Fig. 2 is a side elevation of a commutator and some of its cooperating parts forming part of the receiving system shown in Fig. 1.

Referring to the drawings, one embodiment of this invention comprises a system for the transmission of radiant energy including a transmitting system 10 and a receiving system 11. The transmitting system 10 includes a source of light 12 such, for instance, as an electric arc light or any other suitable source which is preferably arranged in a parabolic or other suitable reflector 13, the arc 12 being supplied with current from any suitable source. The arc when arranged in a parabolic reflector is of course arranged so as to transmit a beam of light in the form of parallel rays. Any suitable shutter 14 may be arranged in front of the reflector 13 to control the emission of light from the reflector.

The receiving system 11 comprises a condensing lens 20 which is held in fixed position and which is arranged to condense the light rays received from the arc 12 upon a suitable light responsive device or detector 25, which in the present instance is a selenium cell. This cell 25 is fixed in position and is arranged in a normally closed circuit 26 including a battery 27, an electromagnet 28, a movable contact 29 and a fixed contact 30 in the form of a resilient, flexible strip of metal fixed at one end and arranged to cooperate with the movable contact 29. The movable contact 29 forms part of a resilient flexible strip 31.

For causing the selenium cell 25 to control selectively one or more separately operative devices, a cylindrical commutator 35 is mounted upon a shaft 36 to rotate about a fixed axis. The body of this commutator is preferably made of insulating material and is provided on its cylindrical surface with a plurality of contacts 37, 38, 39, arranged to cooperate respectively with a corresponding number of pairs of brushes 37'—37', 38'—38', 39'—39'. One end of the commutator 35 is provided with a plurality of marginal slots 50' equispaced around the commutator the number of slots being twice the number of contacts 37, 38, and 39, and each alternate slot being in alinement with a corresponding contact.

Arranged adjacent the commutator 35 and mounted upon a fixed pivot 50 to oscillate about an axis parallel to the axis of rotation of the commutator 35 is a bellcrank 51 one end of which is provided with a tooth 52 which is arranged to engage successively in the slots 50', the tooth 52 being normally pressed into the slots 50' by means of a spiral spring 53 connected at one end to the lower arm of the bellcrank 51 and at its other end to a fixed post 54. The hereinbefore described movable contact 29 is secured to the end of the bellcrank 51 carrying the tooth 52 and oscillates in unison therewith into and out of engagement with the fixed contact 30. The other end of the bellcrank 51 is provided with a soft iron plate 55 rigidly secured thereto and which forms the armature of an electromagnet 56 which is in a circuit 57 including a battery 58 and a switch 59. The switch 59 is arranged to swing about a fixed axis and into and out of engagement with a fixed contact 60 which forms a part of the circuit 57. The switch 59 is made of soft iron and forms an armature for and is controlled by the electro-magnet 28, the switch 59 being normally held in an open position by a spring 61. Extending through and fixedly secured in the lower arm of the bellcrank 51 is a cylindrical insulating piece 65 through which is threaded an electrically conductive screw 66 which may be locked in any desired position of adjustment by means of a lock nut 67 threaded around the screw and arranged to engage the insulating piece 65. The inner end 68 of this screw 66 is arranged to be moved into and out of engagement with an elongated, flexible, resilient contact 69 one end of which is fixedly secured to a fixed insulating post 70. The screw 66 and the contact 69 are in an electric circuit 75 which includes a battery 76 and which is arranged to operate a motor 77 which is arranged to rotate the shaft 36 upon which the commutator 35 is fixedly mounted. The several pairs of brushes 37'—37', 38'—38', 39'—39' are arranged respectively in circuits 80, 81 and 82 containing respectively batteries 83, 84 and 85, and slow acting relays 86, 87 and 88 controlling respectively normally open circuits 90, 91, and 92 containing respectively batteries 93, 94, and 95. These last mentioned circuits 90, 91, and 92 may be arranged to selectively control a corresponding number of devices.

In the operation of this improved system the parts are normally as shown in Fig. 1 with the shutter 14 closed. When the shutter 14 is open a beam of light is transmitted to the lens 20 and by the lens 20 the rays of light are converged upon the selenium cell 25. By the action of the light upon the cell 25 the apparent insulating quality or normal high resistance of the cell 25 is overcome to such an extent as to permit a current to flow from the battery 27 through the circuit 26 thus energizing the electro-magnet 28 and closing the circuit 57 through the battery 58, thus energizing the electromagnet 56 which draws the armature 55 towards the magnet 56, thus moving the terminal 68 into engagement with the contact 69 and thus closing the circuit 75 through the motor 77. At the same moment that the circuit 75 is closed through the motor, the tooth 52 has reached a point in its outward movement just beyond the cylindrical surface of the commutator 35 thus permitting the commutator 35 to be rotated by the motor. Owing to the resilient nature of the contact 30, this contact remains in engagement with the contact 29 during this upward movement of the tooth 52 and until the tooth has been moved slightly above the point just mentioned. A further slight upward movement of the tooth 52 which is permitted by the resilient nature of the contact 69 and which is effected by the action of the electro-magnet 56 acts to move the contact 29 out of engagement with the contact 30 thus breaking the circuit through the cell 25 a moment after the circuit 75 has been closed and the motor has been started to rotate. The breaking of the circuit through the cell 25 deenergizes the electromagnet 28 and consequently breaks the circuit 58 through the electro-magnet 56 thus permitting the spring 53 to press the tooth 52 again towards the commutator 35 and causes the tooth 52 to fall into the next slot 50' following the one from which it had been released. As the tooth 52 moves back into engagement in this next slot 50' the circuit 26 through the selenium cell 25 is again closed. The parts are so arranged and adjusted that as the commutator is thus rotated through one step the circuit through the cell 25 remains open for a sufficient length of time to restore the cell to its normal nonconducting condition, thus rendering it responsive to a further light signal. By thus rotating the commutator step by step the several circuits 90, 91, and 92 may be selectively closed to control corresponding devices. As the commutator is rotated step by step each alternate step brings the commutator into a neutral position with respect to the brushes 37', 38', and 39', and each of the other steps of the commutator closes one of the circuits 80, 81, or 82 through the corresponding contacts 37, 38, and 39 and corresponding brushes 37', 38' or 39'.

Although I have shown in the accompanying drawings only one form in which this invention may be embodied it is to be understood that the invention is not limited in its application to this particular form, but might be applied in various forms and for various purposes without departing from the spirit of the invention or the scope of the appended claims.

Having thus fully described this invention, I claim:

1. A receiving system for radiant energy comprising a normally closed circuit including a single selenium cell and means automatically operative to open said cell momentarily as a result of the action of radiant energy upon said cell.

2. A receiving system for radiant energy comprising a normally closed circuit including an element responsive to radiant energy and a source of electrical energy and means automatically operative to disconnect said source from said element momentarily as the result of the action of radiant energy upon said element.

3. A receiving system for radiant energy comprising a normally closed circuit including an element responsive to radiant energy, and a source of electrical energy, said element presenting a relatively high resistance to the passage of electrical current through said circuit when uninfluenced by radiant energy, and presenting decreased resistance to the flow of electrical current when acted upon by radiant energy, and means automatically operative to disconnect said source from said element momentarily after the resistance of the element has been decreased.

4. A receiving system for radiant energy comprising a circuit having a detector of radiant energy and a source of electrical energy connected in series and means automatically operative to disconnect said detector from said source as the result of the action of radiant energy upon said detector.

5. A receiving system for radiant energy including a detector of radiant energy and a source of electrical energy connected in series, the electrical potential of said source being such as to cause a predetermined current to flow through said detector when said detector is not being acted upon by radiant energy and means automatically operative to reduce the current to zero as the result of the action of radiant energy upon said detector.

6. The method of receiving radiant energy which comprises concentrating the received energy upon an element responsive thereto, supplying locally derived energy to said element and momentarily discontinuing the supply of locally derived energy as the result of the action of radiant energy upon the sensitive element.

7. The method of receiving radiant energy which comprises concentrating light rays upon an element responsive thereto, supplying locally derived energy to said element and momentarily discontinuing the supply of locally derived energy as the result of the action of the light rays upon the sensitive element.

Signed at Gloucester in the county of Essex and State of Massachusetts, this 29th day of December A. D. 1919.

JOHN HAYS HAMMOND, Jr.